United States Patent [19]

Landgraf et al.

[11] 3,972,761
[45] Aug. 3, 1976

[54] WRAPPING OF PIPES OR TUBES

[75] Inventors: Helmut Landgraf, Rumeln-Kaldenhausen; Walter Quitmann, Angermund, both of Germany

[73] Assignee: Mannesmann Aktiengesellschaft, Dusseldorf, Germany

[22] Filed: Feb. 3, 1975

[21] Appl. No.: 546,352

[30] Foreign Application Priority Data
Feb. 12, 1974 Germany............................ 2407427

[52] U.S. Cl................................ 156/187; 156/192; 156/195; 156/229; 156/244; 156/361; 264/173; 264/40.7
[51] Int. Cl.²......................................... B65H 81/02
[58] Field of Search ............ 156/187, 188, 190, 195, 156/229, 244, 356, 360, 361, 392, 429, 430, 192; 264/288, 209, 210 R, 173, DIG. 73, 40

[56] References Cited
UNITED STATES PATENTS

| | | | |
|---|---|---|---|
| 2,398,876 | 4/1946 | Bailey | 156/195 |
| 3,271,064 | 9/1966 | Hall | 156/244 |
| 3,616,006 | 10/1971 | Landgraf et al. | 156/188 |
| 3,706,624 | 12/1972 | Rinker | 156/195 |
| 3,802,908 | 4/1974 | Emmons | 156/188 |
| 3,814,646 | 6/1974 | Meyer et al. | 156/195 |
| 3,823,045 | 7/1974 | Hielema | 156/188 |

Primary Examiner—Douglas J. Drummond
Assistant Examiner—Basil J. Lewris
Attorney, Agent, or Firm—Ralf H. Siegemund

[57] ABSTRACT

A steel pipe with longitudinal welding seam is wrapped helically by means of a polyethylene ribbon which is normally stretched, but temporary stretch relief provides for a thicker envelope above and adjacent to the seam. A ribbon deflector roll and a pressure roll provide the stretching through a speed differential which is changed as stretch relief.

11 Claims, 2 Drawing Figures

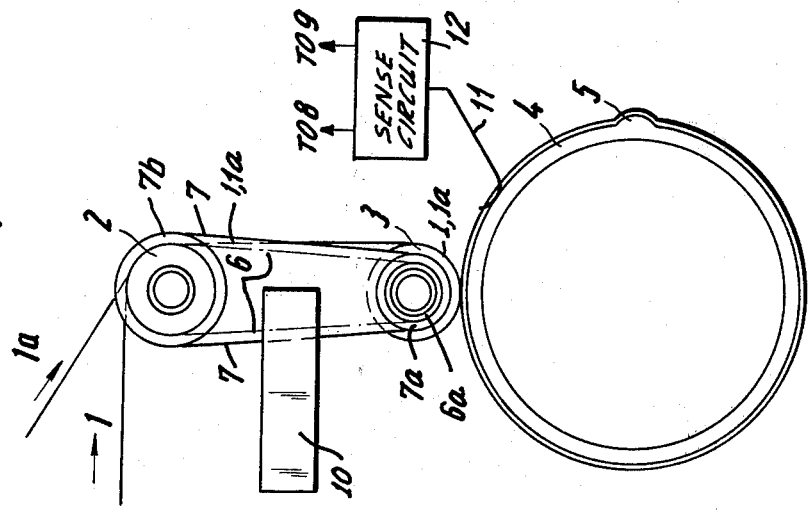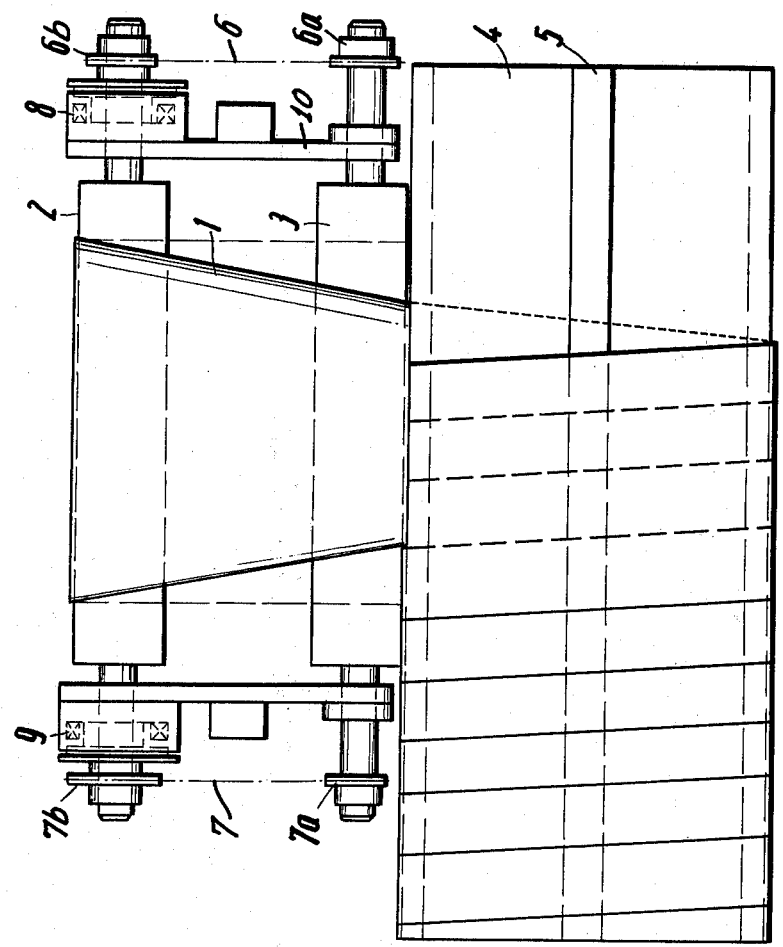

WRAPPING OF PIPES OR TUBES

BACKGROUND OF THE INVENTION

The present invention relates to enveloping a steel pipe or tube, possibly having a longitudinal welding seam. More particularly, the invention relates to improvements in the enveloping of such tubes or pipes using a thermoplastic ribbon which, for example, is being extruded right before being wound onto the respective tube or pipe.

The purpose of such an envelope generally is to provide for a protection of the steel pipe or tube if it is to be installed underground and in direct contact with the soil. The envelope may be made of an extruded polyethylene tape. Method and equipment for enveloping tubes and pipes have become known, in that, for example, a polyethylene ribbon or tape is extruded towards a pipe or tube, and a roll or pully guides the tape into immediate proximity of the tube while a pressure roll urges the tape into contact with the tube. The tube rotates on its axis and is also advanced axially so that a helical wrapping is obtained.

The surface of the tube may be provided with an adhesive, and the tube may rotate with a peripheral speed which is faster than the extrusion speed, so that the ribbon or tape as wound is stretched in the process.

The German Pat. No. 1,771,764 corresponding to U.S. Pat. No. 3,616,006 discloses, for example, a method wherein a thermoplastic ribbon and an adhesive ribbon are both wound helically on the rotating and heated steel pipe. Thermoplastic ribbon and adhesive ribbon are separately extruded, but just before the winding in either case, and the adhesive ribbon has properties of highly viscous tackiness at the working temperature.

Steel pipes or tubes with a longitudinal welding seam pose the specific problem that the plastic envelope as produced by means of one of the above described methods may not completely adhere to the pipe surface right at the welding seam, as that seam may have a slightly projecting bead, so that the otherwise cylindrical pipe's surface is uneven. As a consequence, capillary gaps are set up between the envelope and the tube or pipe, and corrosion producing substances may in some way find their way into these gaps.

In order to avoid this problem posed by the formation of gaps, the suggestion has been made (U.S. Pat. No. 3,814,646) to cover the welding seam prior to wrapping of the strip by means of plastic sections for obtaining a smooth interface between tape and pipe. Thermoplastic or thermosetting plastic in powdery, viscous or in form of longitudinal strips can be used here. The problem of the gap formation was solved indeed in that manner. It was found, however, recently that the enveloping of pipes by means of winding of tapes, ribbons or strips may exhibit another problem. It was found that the envelope is somewhat thinner right on the welding seam. On the other hand, the projection of the seam, possibly with additional cover, makes that particular portion of the tube particularly amenable to wear; the fact that the protective cover is thinnest here compounds the problem.

DESCRIPTION OF THE INVENTION

It is an object of the present invention to avoid the formation of gaps as between envelope and tube at or near a welding seam without additional cover of the seam, as that cover.

It is a specific object of the present invention to improve a method according to which a ribbon, strip or tape of plastic material is wound on a steel tube or pipe which advances axially and rotates faster than the ribbon strip or tape is paid for stretching it as it is being wrapped around the pipe or tube.

In accordance with the present invention it is suggested to temporarily relieve the stretching whenever a portion of the tape, strip or ribbon is about to be laid across a welding seam so that the thickness of that portion is locally increased, as it covers the seam. The relief is obtained by temporarily stretching the ribbon, tape or strip less than normal (or not at all) to obtain a locally thicker envelope. The welding seam will normally be longitudinal but that is not essential.

In furtherance of the method, the location of the seam on the rotating pipe may be sensed for controlling the stretch relief just in the right moment, so that the seam be covered with a less stretched and, therefore, thicker wrapping. The thicker portion covers the seam also to both sides, and the transition to the normal, thinner wrapping is a gradual one. All this is instrumental in the avoiding of formation of gaps between the wrapping or envelope, and the seam and adjoining portions of the tube's surface. It should be noted that the temporary nature of the relief will not or hardly cause the otherwise narrowed tape or ribbon to widen instead.

The equipment for wrapping may include a deflection roll and a pressure roll driven normally at a speed differential, but either that differential or their distance from each other is changed temporarily to obtain the said relief. In general, it was found that by this method the slightly thicker portion of the wrapping adheres firmly to the welding seam as well as to adjacent tube or pipe surface portions so that the resulting envelope is not thinner thereat, nor are gaps formed between the envelope and the tube surface next to the seam.

In general, the extrusion should be remote from the deflection and pressure rolls, so that the payout of the tape, ribbon or strip as effective is determined by the rotation of the deflection rolls, and the stretching and relief is the result from the speed and/or position relation between the rolls. The extrusion speed should not be affected by this variation, and compensation of any variation in tension in the tape, ribbon or strip as between extruder and deflection roll could be provided for if necessary.

If an adhesive ribbon is paid in conjunction with the wrapping tape or ribbon, they should be combined before wrapping and winding, so that stretching as well as relief affects both of them.

It should be mentioned that the covering of a welding seam and the problems outlined above gave rise to this invention. However, it will be appreciated that it is applicable wherever for any reason a local thickening of the envelope is desired.

DESCRIPTION OF THE INVENTION

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a front view of equipment for practicing the preferred embodiment of the present invention; and FIG. 2 is a side view of that equipment.

Proceeding now to the detailed description of the drawings, the figures show a thermoplastic ribbon, tape or strip 1, which has just been extruded and is paid by the extruder (not shown) at a particular rate. The strip may consist of polyethylene. Concurrently thereto, an adhesive ribbon 1a is also extruded, and is paid in a different direction, so that both, strip 1 and ribbon 1a run towards the direction changing pully or roll 2.

Strip 1 and ribbon 1a are jointly guided by a deflection roll 2 towards a pressure roll 3 urging them into engagement with a helically rotating steel pipe or tube 4. The strip 1 is combined with ribbon 1a at and on the roll 2 and they run off together. The rotation of roll 2 is responsible for the immediate payout of strip to be wrapped which is now the combined strip 1 and ribbon 1a.

Pipe 4 advances axially as well rotationally. The drive mechanism is not shown and is conventional. The pipe 4 has a longitudinal welding seam, which resulted particularly in a protruding bead 5.

Roll 2 is mounted on a shaft 3a which is journalled in a frame 10, and roll 3 sits also on a shaft 3a, which is also journalled in frame 10. Roll 3 rotates in synchronism with the rotation of the pipe 4, so that they have equal peripheral speeds. Actually, roll 3 rolls on the pipe (the wound strip being interposed), so that the pipe drives the roll 3 by frictional engagement, the strip serving as intermediary. The roll 2 is driven from roll 3 in that shaft 3a carries two sprocket wheels 6a and 7a respectively drivingly linked with sprocket wheels 6b and 7b on shaft 2a of roll 2 by means of chains 6 and 7. Wheels 6b and 7b provide respectively the inputs for electrically operable clutches 8 and 9. These clutches can connect either wheel 6b or wheel 7b to shaft 2a of roll 2.

As can be seen, sprocket wheel 6a has smaller diameter than wheel 7a and wheel 6b is smaller than wheel 7b, but wheels 6a and 6b have (about) the same diameter, while the diameter difference between wheels 6a and 7a is significant. As a consequence, roll 2 (having the same diameter as roll 3) will be driven at the same peripheral speed as roll 3 when clutch 8 is engaged while roll 2 will be slower when clutch 9 is engaged and the system 7, 7a, 7b provides for transmission of motion. Of course, only one clutch at a time will be engaged and operated unless clutch 8 is provided with a free wheeling mechanism.

Normally, clutch 9 is engaged, so that the roll 2 rotates slower than roll 3 and the combined strip and ribbon are stretched prior to winding. Upon changing engagement or upon engaging clutch 8, while clutch 9 free wheels (one way override), roll 2 moves faster, so that strip which has been stretched less, is temporarily wound on the pipe.

The similarity in diameter of sprocket wheels 6a and 6b is only one way of obtaining relief. Decisive is that the transmission ratios for 7a, 7b, 7 and 6a, 6b, 6 differ. Wheel 6b may be somewhat larger than 6a or wheel 6b may actually be smaller. The difference in transmission ratios determines the extent of relief in stretching as produced.

The relaxation as produced is to last only briefly so as to obtain a local thickening of the strip, i.e clutch 8 is engaged only briefly, and shortly thereafter stretching by means of a speed differential between rolls 2 and 3 is resumed. The relief is effective over the entire length of the strip between rolls 2 and 3, including that portion of the strip just about to be placed onto the tube or pipe 4, so that a slightly thicker wrapping is obtained right after the onset of the stretch relief. As soon as the relief is terminated, the "old" thickness of the strip portion between 2 and 3 is restored, so that wrapping at normal thickness resumes almost instantly, but there is no step in the thickness. The transition between increased and normal thickness is a gradual one.

In order to automate the operation, a feeler 11 is provided in a suitable position to operate a control and switching circuit 12, which will turn clutch 8 on briefly whenever the seam bead 5 is sensed, so that the layer placed thereon is thicker.

From a certain point of view the stretch relief as produced by control circuit 12 is periodic in nature recurring with each revolution of the pipe 4, and in this specific case sensing by feeler 11 ties that operation to a particular phase and condition of the pipe. From a different point of view, the feeler 11 provides follow-up control and is effective anew on each revolution. The welding seam may have any contour (e.g. helical), and the feeler merely responds to the condition that necessitates the local increase in the envelope by means of stretch relief as described.

The distance between rolls 2 and 3 should be considerably shorter than the distance of the extruders from the roll 2 and dancing (compensating) rolls in that space may be provided to maintain the tension in the ribbon and strip constant. The variation in stretching is effective only between the rolls and should not affect the extrusion.

As an alternative mode of controlling stretch relief one can provide a separate drive for roll 2 to drive it at a higher rate when the amount of tape material wound is to be increased. For example, the roll 2 may be driven normally by a sprocket drive as shown (7a, 7b, 7), but a free wheeling or one-way override clutch is interposed permitting the roll 2 to be driven faster temporarily, for example, by means of an electromotor coupled to shaft 2a by clutch 8, whenever needed to relax the stretching of the strip.

Another modification is to be seen in changing the distance between the rolls 2 and 3. They are driven normally by a chain (or two) and, for example, through cam operation, or hydraulically, the rolls are drivingly linked to the rotation of the pipe. For stretch relief, the distance between the rolls is shortened briefly for thickening the cover on the seam. Essential in each distance is that the stretch as provided on the strip by rolls 2 and 3 be relieved temporarily, by modifying the relation between the speed of applying the strip to the pipe (roll 3) and the speed of payout as immediately effective (namely the speed with which the strip runs off roll 2). Upon changing the distance between the rolls, the speed of roll 2 as it approaches roll 3 is added to the peripheral speed of the roll to become the effective payout speed of the strip at that point. Temporary speed increase of roll 2 as described earlier has the analogous effect.

The invention is not limited to the embodiments described above, but all changes and modifications thereof not constituting departures from the spirit and scope of the invention are intended to be included.

We claim:

1. In a method of wrapping thermoplastic ribbon, tape or strip around a pipe or tube, which has a welding seam and rotates on its axis and advances axially so that the ribbon, tape or strip is wound helically onto the pipe or tube and wherein the speed of payout of the ribbon, tape or strip is slower than the tangential speed of the surface of the rotating tube or pipe thereby stretching the ribbon, tape or strip just ahead of winding, the improvement of temporarily relieving the stretching for a period which is short relative to the period of one revolution of the pipe for locally increasing the thickness of the ribbon, tape or strip as wound on the tube or pipe for covering an axial portion of the seam with a thickened tape; and periodically repeating the temporary relief at the rate of rotation of the pipe or tube to obtain an axially extending region of thicker thickness of an envelope as resulting from said winding.

2. In a method as in claim 1, wherein the temporary relief results from temporarily decreasing a speed differential between the payout of the ribbon, tape or strip as effective in the vicinity of the rotating pipe or tube and the winding speed.

3. In a method as in claim 1, wherein the pipe or tube has a welding seam with projecting bead, the method including sensing the disposition of the seam and controlling the relief in response thereto to thicken the envelope above the bead.

4. Method as in claim 1, wherein an adhesive ribbon is paid also for interpositioning between the said plastic ribbon, tape or strip and said pipe or tube, and combining the adhesive ribbon therewith for undergoing stretching as well as relief together.

5. Method as in claim 1, including urging the ribbon, tape, or strip onto the pipe or tube by means of a pressure roll, providing said slower speed by running the ribbon, tape or strip over a deflecting roll running at different speed; and controlling the effective stretching of the ribbon, tape or strip between said rolls.

6. Method as in claim 6, including changing the speed differential to obtain said relief.

7. Method as in claim 6, including driving the deflecting roll normally from the pressure roll, the relief provided by temporarily driving the deflecting roll at a higher speed, the higher speed being that of the pressure roll.

8. Method as in claim 7, including using a different transmission ratio for driving the deflecting roll from the pressure roll.

9. Method as in claim 8 including using clutch control for temporarily driving the deflection roll faster than normal.

10. Method as in claim 5, including changing the distance between said rolls.

11. Method as in claim 1, wherein said ribbon, tape or strip is extruded, the effective payout thereof being controlled in the vicinity of the pipe or tube remote from extrusion.

* * * * *